(12) United States Patent
Yan et al.

(10) Patent No.: US 9,384,648 B2
(45) Date of Patent: Jul. 5, 2016

(54) MARINE EMERGENCY POSITION INDICATING SYSTEM

(75) Inventors: Xiaoshang Yan, Shanghai (CN); Yi Liang, Shanghai (CN); Peng Yan, Shanghai (CN)

(73) Assignee: SHANGHAI RADIO EQUIPMENT INSTITUTE, Shanghai (CN)

( * ) Notice: Subject to any disclaimer, the term of this patent is extended or adjusted under 35 U.S.C. 154(b) by 0 days.

(21) Appl. No.: 13/703,540

(22) PCT Filed: Nov. 11, 2011

(86) PCT No.: PCT/CN2011/001885
§ 371 (c)(1),
(2), (4) Date: Dec. 11, 2012

(87) PCT Pub. No.: WO2013/037095
PCT Pub. Date: Mar. 21, 2013

(65) Prior Publication Data
US 2014/0191865 A1      Jul. 10, 2014

(30) Foreign Application Priority Data

Sep. 13, 2011  (CN) .......................... 2011 1 0269403
Sep. 13, 2011  (CN) .......................... 2011 1 0269405
Sep. 13, 2011  (CN) .......................... 2011 1 0269423

(51) Int. Cl.
G08B 1/08       (2006.01)
G08B 21/08      (2006.01)
(Continued)

(52) U.S. Cl.
CPC ................. *G08B 21/088* (2013.01); *G01S 3/48* (2013.01); *G01S 5/0231* (2013.01); *G01S 5/12* (2013.01); *G01S 11/06* (2013.01)

(58) Field of Classification Search
None
See application file for complete search history.

(56) References Cited

U.S. PATENT DOCUMENTS 4,021,807 A  *  5/1977  Culpepper et al. ............ 342/458
5,543,801 A  *  8/1996  Shawyer ....................... 342/354
(Continued)

FOREIGN PATENT DOCUMENTS

CN        201302609 Y      9/2009
CN        101661094 A      3/2010
CN        20151201 U       6/2010

OTHER PUBLICATIONS

CN201302609—Maritime emergency position-indication tracking equipment for individual; Machine translation.*

(Continued)

*Primary Examiner* — Firmin Backer
*Assistant Examiner* — Shawna M Kingston
(74) *Attorney, Agent, or Firm* — Oliff PLC (57) ABSTRACT

A marine emergency position indicating system that can communicate wirelessly between beacon and search engine is provided. When someone carrying the beacon falls into the water, power supply of the beacon opens through drowning automatic switch or manual switch, therefore the beacon can emit wireless SOS signals out. Rescue boat or aircraft installed with search engine can search and receive SOS signals sent from beacons over a 5-kilometer radius along the way to accidental site. The search engine can distinguish the beacons around this area and determine the direction and approximate distance between drowning persons carrying beacons and the search engine through wireless communication technology and wireless positioning technology to help rescuers implement fixed-point rescue. Therefore, the marine emergency position indicating system can overcome the bad weather impact on marine rescue, speed up the rescue process and improve the success possibilities of fixed-point rescue.

10 Claims, 5 Drawing Sheets

(51) Int. Cl.
*G01S 5/02* (2010.01)
*G01S 3/48* (2006.01)
*G01S 5/12* (2006.01)
*G01S 11/06* (2006.01)

(56) References Cited

U.S. PATENT DOCUMENTS 6,972,677 B2 * 12/2005 Coulthard .................... 340/531
2008/0143482 A1 * 6/2008 Shoarinejad et al. ........ 340/10.1
2009/0040041 A1 * 2/2009 Janetis et al. ............ 340/539.13
2014/0051461 A1 * 2/2014 Ranki et al. ................. 455/456.1

OTHER PUBLICATIONS

International Search Report for PCT/CN2011/001885, Dated May 3, 2012.

* cited by examiner

MARINE EMERGENCY POSITION INDICATING SYSTEM

CROSS-REFERENCE TO RELATED APPLICATIONS

This application is a national stage of International Application No. PCT/CN2011/001885, filed Nov. 11, 2011, which claims priority to CN Application No. 201110269405.1, filed Sep. 13, 2011; CN Application No. 201110269423.X, filed Sep. 13, 2011; and CN Application No. 201110269403.2, filed Sep. 13, 2011.

TECHNICAL FIELD

The present invention relates to a marine emergency rescue communication equipment, especially a marine emergency position indicating system.

BACKGROUND TECHNOLOGY

According to the relevant provisions of IMO and China MSA, most ships are installed communication rescue equipment such as VHF radio station, marine radio telephone, GPS and INMARSAT SES. Ships can call rescue teams for help through these equipments in case of accident. However, when someone has fallen into water, he or she will drift away from the site under the action of current. As the drowning person mostly carries no personal communication or position indicating equipment, it is very difficult for rescuers to determine the detailed position of the drowning person, when they arrive to find the wrecked ship. Up to now, rescuers fall behind in rescue methods. They can only speculate the possible location of the drifted drowning person through analysis of water flow condition within the accidental area, or dragnet over sea with camera system, illuminating system and infrared night-vision system. Anyway, it is even tough to speculate the location of drowning person at coastal reefs with complex and ever-changing circulation. Rescue becomes more difficult during severe weather.

INVENTION DISCLOSURE

The object of the present invention is to provide a marine emergency position indicating system, which positions signals from adjacent beacon by radio direction finding to help rescuers determine the position of drowning people carrying the beacon, through search engine mounted in rescue boat or rescue aircraft. Therefore the present invention can overcome the impact of bad weather on marine rescue, speed up the rescue process, and improve the success probability of fixed-point rescue.

In order to achieve the purpose mentioned above, the technical proposal of the present invention is to provide a marine emergency position indicating system, which includes the following parts:

Beacon, which is always carried by marine staff and is able to send out wireless communication signals after shipwreck, is comprised of power supply circuit, signal process circuit and antenna with electrical connection.

Search engine, mounted in rescue boat or aircraft towards the accident site, receives wireless communication signals from all neighboring beacons within a certain range and has signal demodulation module for user identification and conflict detection and two signal process modules for calculating relative distance and direction of each beacon based on the communication signals.

The power supply circuit of the above mentioned beacon is comprised of power management module, signal trigger switch and battery, which are respectively electrical connected to the mentioned power management module. The mentioned signal trigger switch is comprised of manual switch and drowning automatic switch respectively connected to the mentioned power management module. Wherein, The mentioned battery provides working power for the beacon.

The mentioned manual switch can be used to manually open the power management

The mentioned drowning automatic switch can automatically open the power management module to make the beacon entering into working status by the way of detecting immergence.

The mentioned power management module can convert the power supply from battery into stable output working power when manual switch or drowning automatic switch is opened.

A power switch, located between the mentioned battery and the power management module, can control the beacon to switch states between low power standby and power-off.

The mentioned signal process circuit of the beacon is comprised of system control module, modulation module, power amplifier and filter, all of which are electrical connected successively; the mentioned system control module is connected to the mentioned power management module. The mentioned filter is connected to the mentioned antenna. Wherein, The mentioned system control module transmits emitting data to the modulation module and controls the emitting timeline, after receiving working power output from the power The mentioned modulation module converts the received emitting data into modulated signals and transfers the signals to the power amplifier.

The mentioned power amplifier amplifies the received modulated signals to the emitting power required and transmits them to filter.

The mentioned filter receives the amplified signals from the power amplifier, and filters The mentioned beacon also contains a buzzer electrical connected to the power management module. The buzzer beeps when it receives the stable output working power from the power management module.

The mentioned search engine includes the following additional parts:

Communication antenna receives the wireless communication signals matched with beacon's emitting frequency.

Filter amplifier module receives signals output from the mentioned communication antenna, filters noise from them and amplifies the needed radio signals.

The mentioned signal demodulation module demodulates the signals output from the filter amplifier module, determines whether the signal is sent from the beacon with simultaneously deciding on beacon ID to distinguish multi-users according to the demodulated information, and confirms validity of this communication to realize conflict detection based on correctness of transmitted data.

The module within the mentioned search engine indicating the relative distance is comprised of, signal detect module which detects amplitude of the signals output from the filter amplifier module and estimates on the relative distance between the sending beacon and the mentioned search engine.

The module within the mentioned search engine indicating the beacon direction is comprised of:

the direction finding antenna array, which is comprised of multiple antennas according to the design of distribution array, can respectively receive the wireless communication signals matched with the same beacon's emitting frequencies;

antenna signal process module, which integrates the multi-channel signals from the receiving antennas of the mentioned measure antenna array into one channel;

mixer amplifier module, which converts the integrated one channel signal output from the mentioned antenna signal process module to a pre-set frequency and amplifies this signal in the whole signal range to a pre-set output amplitude;

direction finding data process module, which samples the signals output from the mixer amplifier module on time-division base, recovers the multi-channel signals received from the direction finding antenna array, calculates phase differences of the multi-channel signals and determines the relative direction between the sending beacon and the mentioned search engine.

Furthermore, the antenna signal process module contains the following parts:

interface driving module, which receives the control instruction and power output from the mentioned search engine host and forms control driving signals;

change-over switch, which integrates the multi-channel received signals from the mentioned direction finding antenna array into one channel by time division based on related control driving instruction;

saw-filter and amplifier, filters and amplifies the integrated signal, and then transmit it to the subsequent modules.

The mentioned change-over switch contains the following parts:

multiple signal input ends, which are connected to the multiple antennas from the mentioned direction finding antenna array respectively and receive the multi-channel signals from them;

several control instruction input ends, which receive related control instructions output from the mentioned search engine host through the mentioned interface driving module;

a signal output end, which is connected to only one received signal of the change-over switch inputs under each strobe status driven by the mentioned control instruction, to make the multi-channel receiving signals exist on time-division base and integrated into one channel signal.

The mentioned search engine additionally contains the following parts:

system control module, which receives signals respectively output from the mentioned signal demodulation module, signal detect module and direction finding data process module, and controls the working status of the whole search engine;

display module, connected to the system control module, directly shows the information depicting direction and distance of the beacon on LCD;

buzzer, connected to the mentioned system control module, beeps differently according to the received beacon signals to remind rescuers.

Compared with current technology, the marine emergency position indicating system mentioned in the present invention has the advantages described as follows. The beacon mentioned in the present invention is carried by marine staff, including crew and passenger. When someone has fallen into the water after ship wreck, the beacon is applicable to send out wireless communication signals and SOS signals. When unused, the beacon's power supply can be cut off to stop working. When someone works outboard, he or she can open the power supply to set the beacon in low power standby status without emitting signals. When someone falls into the water, power supply of the beacon can be opened through drowning automatic switch or manual switch, therefore the beacon can send wireless signals out with double assurance.

On the other hand, rescue boat or aircraft installed with search engine mentioned in the present invention can search and receive SOS signals sent from beacons over a 5-kilometer radius of sea area along the way to accidental site. The search engine can determine the direction and approximate distance between the drowning person carried with beacon and the search engine through radio positioning technology to help rescuers implement fixed-point rescue. Especially, the direction finding antenna array within the search engine receives the same transmitted signal from three different positioned antennas, calculates the phase differences of the three channels of received signals and thereby determines the direction of emitted signals to realize angle measurement. Through switch change-over, the three channels of received signals can be integrated into one channel on time division and effectively overcome the shortcoming of difficult calibration on system phase with decreasing debugging difficulty and lower cost.

Consequently, the marine emergency position indicating system mentioned in the present invention can overcome the bad weather impact on marine rescue, speed up the rescue process and improve the success possibilities of fixed-point rescue.

EMBODIMENTS

The specific embodiment of the present invention will be explained with figures as follows.

The marine emergency position indicating system mentioned in the present invention is comprised of two parts, beacon and search engine. The beacon, carried by marine staff (crew or passengers), is applicable to send out wireless communication signals and SOS signals when someone has fallen into the water after ship wreck. The search engine, equipped on the rescue boat or helicopter towards the accidental site, detects and locates the wireless communication signals sent from the beacon carried by the drowning person, thus determines the direction and distance of the drowning person and guides the rescuers to conduct a rescue effort accordingly.

Figure 1:
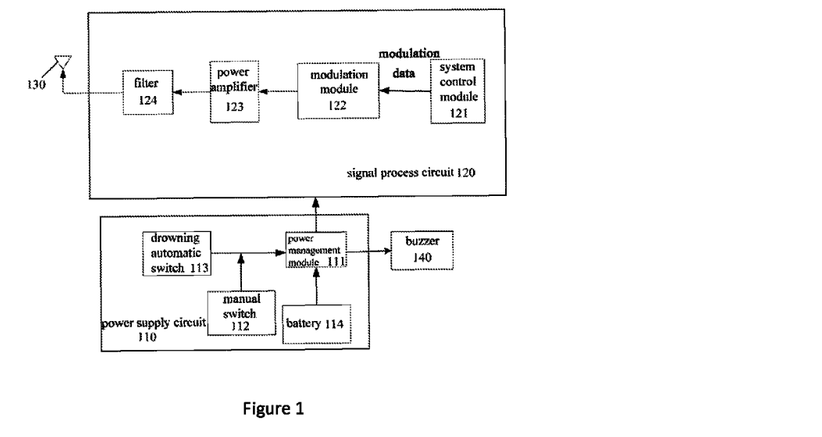
FIG. 1 is the overall structure diagram of personal carried beacon within the mentioned marine emergency position indicating system in the present invention.

The Beacon Part:

FIG. 1 show that as wireless communication signal transmitting section, the beacon mentioned in the present invention is comprised of power supply circuit 110, signal process module 120 and antenna 130, all of which are electrical connected.

The mentioned power supply circuit is comprised of power management module 111, signal trigger switch and battery 114, which are respectively electrical connected to the mentioned power management module 111. The mentioned signal trigger switch contains manual switch 112 and drowning automatic switch 113 which are respectively connected to the mentioned power management module 111. A power switch is set between the mentioned battery 114 and the power management module 111.

The mentioned battery 114 provides working power for the power management module 111 and even the whole beacon. The mentioned manual switch 112 can be used to manually open the power management module 111 to make the beacon entering into working status. The mentioned drowning automatic switch 113 can detect whether it is in water, and determine whether the beacon is fallen into water, then automatically open the power management module 111 to make the beacon open and enter into working status. The mentioned power management module 111 can convert the power supply voltage from battery 114 into stable output working power voltage when manual switch 112 or drowning automatic switch 113 is opened. The mentioned power switch is used for controlling the power management module 111, thus the beacon can switch states between low power standby and power-off.

Figure 2:
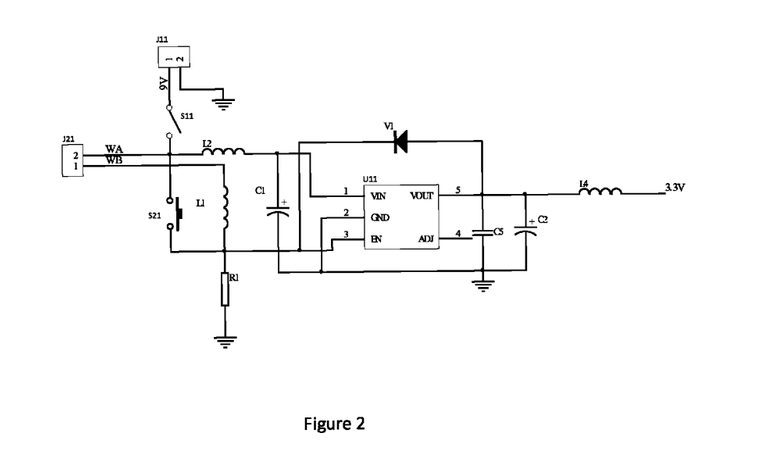
FIG. 2 is the circuit diagram of the power management module within the mentioned beacon in the present invention.

Illustrated as FIG. 1 and FIG. 2, FIG. 2 shows the circuit diagram of the mentioned power management module 111. The mentioned power management module 111, which can be implemented by power supply chip U11 with ADP3339-3.3 series, is used for converting 7V~9V supply voltage from battery 105 into stable 3.3V voltage output. Moreover, VIN pin of U11 is the positive pole of battery power supply input. GND pin is the negative pole of battery power supply input. VOUT pin is 3.3V voltage output. EN pin is chip enable pin, with high level representing working status for U11 and low level representing standby status. ADJ pin is output voltage regulation. As present embodiment uses 3.3V output voltage, no regulation is needed.

The mentioned power switch use power interface J11. When close J11, the battery 114 stops providing power supply to U11. And U11 also stops providing working power to the beacon. Thus the beacon stops working. When opening J11, the beacon is at low power standby status without emitting signals.

The mentioned drowning automatic switch 113 uses water switch J21. When the two endpoints of J21 are immersed into water, J21 conducts and triggers EN pin of U11 to high level, such that U11 is opened to working status and converts 7V~9V supply voltage from battery 114 into stable 3.3V output working power voltage for the beacon.

The mentioned manual switch 112 uses ordinary button switch S21. When S21 is pushed down, EN pin of U11 will also be triggered to high level, such that U11 is opened to working status and converts 7V~9V supply voltage from battery 114 into stable 3.3V output working power for the beacon.

The mentioned signal process circuit 120 contains system control module 121, modulation module 122, power amplifier 123 and filter 124, which are respectively connected successively. The mentioned system control module 121 is connected to the mentioned power management module 111. The mentioned filter 124 is connected to the mentioned antenna 130.

In the present embodiment, the mentioned system control module 121 can use chip series MEGA48V-10AN. When receiving 3.3V working voltage output from power management module 111, it enters working status, transmits emitting data to modulation module 122 and controls the detailed emitting timeline. The mentioned modulation module 122 uses chip series ADF7020-1, converts the emitting data into modulated signal and transmits it to power amplifier 123. The mentioned power amplifier 123 amplifies the received modulated signal to emitting needed power. The mentioned filter 124 receives the amplified modulated signal from the power amplifier 123 and filters its noise and harmonic.

Finally, the wireless signal after modulated, amplified and filtered, is sent out through antenna 130.

The mentioned beacon additionally contains buzzer 140 electrical connected to the power management module 111. When receiving 3.3V working voltage output from the power management module 111, the buzzer 140 beeps for security warning and calls the attention of rescuers. In the present embodiment, the mentioned buzzer 140 uses small electrical horn.

Consequently, the personal portable beacon mentioned in the present invention can be carried or sewed within life jacket. When the beacon is not in use, the power switch is closed and the beacon is power off and stops working. When the crew or passengers take activity outside onboard, the power switch should be opened to make the beacon at low power standby status without sending signals. Anyway it has the function of automatic starting up when drowning, or can be opened with manual switch. In case of accidents of crew or passengers fallen into the water, the beacon can be opened through the drowning person pushing down the manual switch 112 or drowning automatic switch 113 conducted as immersed by the sea water. Then after the power management module 111 converts the voltage supply from the battery 114 into stable working power, the system control module 121 is triggered to transmit emitting signal to modulation module 122. After further modulated, amplified and filtered, the emitting wireless SOS signal is sent out by the antenna 130 to the search engine and then waits for being received by the search engine, which can determine the detailed location of the drowning person and speed up rescuer process.

Figure 3:
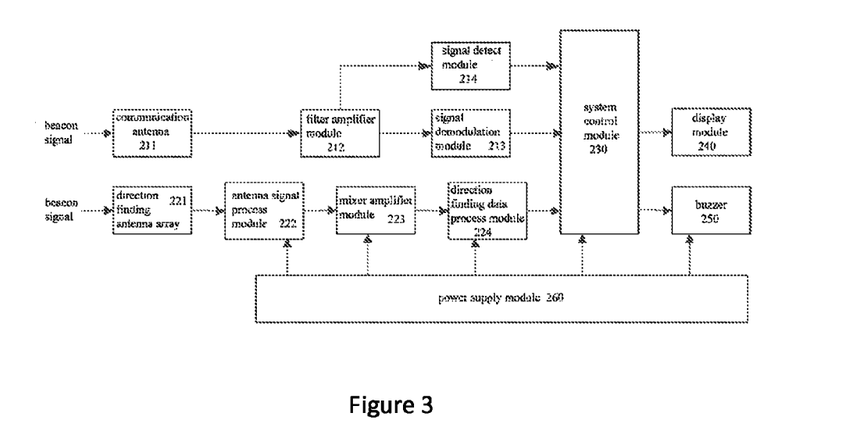
FIG. 3 is the overall structure diagram of onboard search engine within the mentioned marine emergency position indicating system in the present invention.
Figure 4:
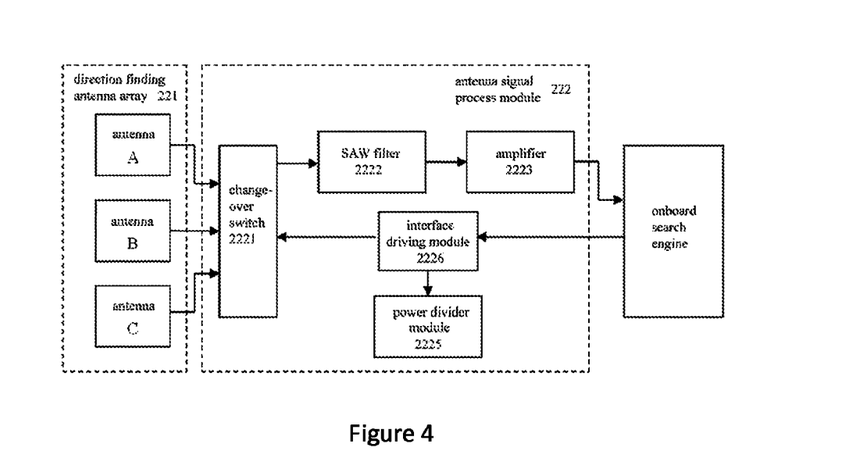
FIG. 4 is the structure diagram of direction finding antenna array and antenna signal process module within the mentioned search engine in the present invention.

Onboard Search Engine Part:

Illustrated as FIG. 3 and FIG. 4, the mentioned search engine in the present invention, as wireless communication signal receiving part, contains antenna device and search engine host connected to antenna through corresponding control cable and radio frequency cable. The mentioned antenna device is comprised of communication antenna 211, direction finding antenna array 221 and antenna signal process module 222. Other modules in FIG. 3 are all within the search engine host.

Specifically, in the mentioned search engine, communication antenna 211 is responsible of transmitting the received wireless communication signal to filter amplifier module 212. Filter amplifier module 212 is responsible of filtering its noise, amplifying the needed radio signal and transmitting it to signal demodulation module 213.

The signal demodulation module 213 demodulates the communication signal and determines whether the wireless SOS signal is sent from the beacon. It also has the function of multi-user identification and conflict detecting. The signal demodulation module 213 decides on beacon ID to distinguish multi-users according to the demodulated information, and confirms validity of this communication to realize conflict detection based on correctness judgment of transmitted data.

As to SOS signal from beacon, the mentioned signal detect module 214 is responsible of detecting amplitude of the signal output from the filter amplifier module 212 and calculating the relative distance between beacon sending this SOS signal and the mentioned search engine according to the algorithm of corresponding relation between amplitude of received signal and relative distance. The mentioned relation can be obtained by multiple field tests.

On the other hand, the mentioned direction finding antenna array 221 is comprised of 3 antennas A, B and C, according to the design of distribution array, which respectively receive the wireless communication signals sent from the same beacon and transmit to antenna signal process module 222. The antenna signal process module 222 has change-over switch 2221, which can integrate the three channels of received signals into one channel on time division according to related control driving instructions. The one channel integrated signal is then filtered and amplified sequentially by SAW filter 2222 and amplifier 2223, thus it can effectively reduce noise figure when the integrated signal is transmitted to the search engine host through radio frequency cable.

Figure 5:
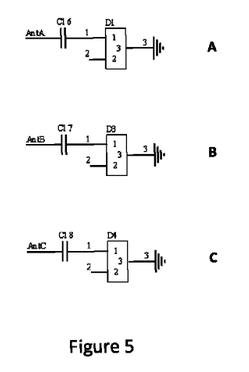
FIG. 5 is the circuit diagram of the three receiving antennas of the direction finding antenna array within the mentioned search engine in the present invention.
Figure 6:
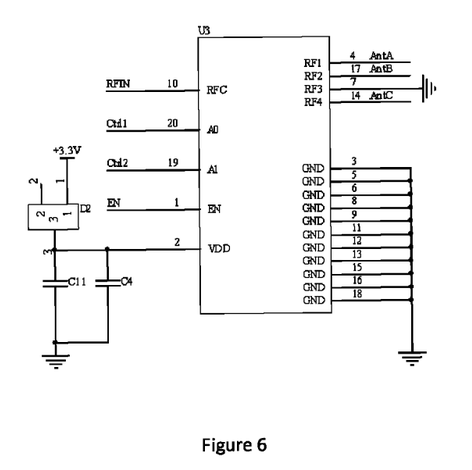
FIG. 6 is the circuit diagram of change-over switch within the mentioned search engine in the present invention.

Please refer to FIG. 4, FIG. 5 and FIG. 6 for the detailed circuit diagram. The mentioned three receiving antennas A, B and C are arranged at different positions as required and output three channels of received signals from Ant A to Ant C into chip U3 of the mentioned change-over switch 2221, after receiving the same radio signal. As illustrated connection in FIG. 5, the corresponding module D1, D3 and D4 respectively within the three antennas A, B and C are diodes of type HSMP3812. As antennas are normally installed at high location outdoor, these diodes can lead large voltage signals caused by lightening to ground to prevent damage to post stage circuit. In the chip U3 of mentioned change-over switch 2221, pin 4, pin 17, pin 7 and pin 14 are respectively set as four signal input end points from RF1 to RF4. The above mentioned three channels of received signals from Ant A to Ant C are respectively sent to signal input end points RF1, RF2 and RF4 as shown in FIG. 6.

Figure 9:
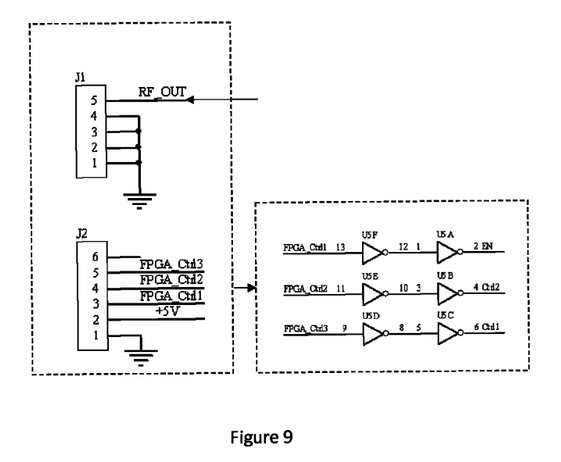
FIG. 9 is the circuit diagram of interface driving module within the mentioned search engine in the present invention.

As illustrated in FIG. 4, FIG. 6 and FIG. 9, the chip U3 of mentioned change-over switch 2221 allocates pin 20, pin 19 and pin 1 as three control instruction input end points A0, A1 and EN. An interface driving module 2226, with 7-wired control joint J2, is connected to the onboard search engine host through 7-core cable and receives +5V power supply from the search engine host, ground and three channels of control instructions from FPGA_Ctrl1 to FPGA_Ctrl3. The mentioned control instructions, respectively driven by two NOT gates, generate three driving instructions Ctrl1, Ctrl2 and EN, which are correspondingly sent to the mentioned three control instruction input endpoints A0, A1 and EN of the change-over switch 2221 U3. As shown connection in FIG. 6, module D2 is another diode, forming a voltage divider circuit and converting 3.3V into 2.6V voltage used by other switches.

The mentioned driving instruction EN is the chip enable signal of U3. With additional level combination of driving instruction Ctrl and Ctrl2, switch selection for the above mentioned four signal input endpoints from RF1 to RF4 of U3 can be completed as show in table 1.

TABLE 1

| Ctrl1 | Ctrl2 | select |
|-------|-------|--------|
| low   | low   | RF1    |
| low   | high  | RF2    |
| high  | low   | RF3    |
| high  | high  | RF4    |

Under the control of the driving instruction Ctrl1 and Ctrl2, signal output endpoint RFC of the mentioned change-over switch 2221, referred as pin 10 of U3 in FIG. 6, is only connected to one input signal in each selected status and then send it out. Therefore, through variably modifying status of Ctrl1 and Ctrl2, the three channels of received signals from Ant A to Ant C can exist on time division and then are integrated into one channel signal RFIN.

Figure 7:
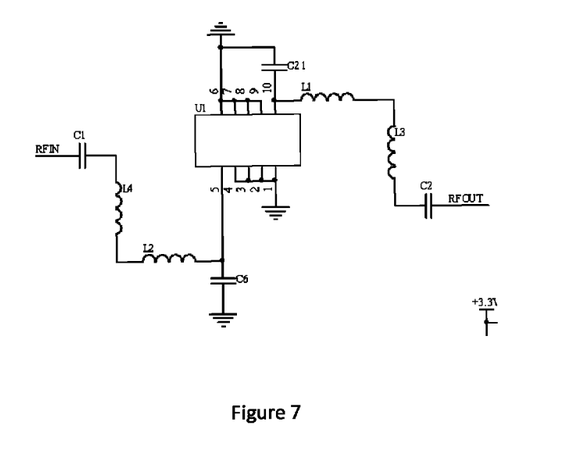
FIG. 7 is the circuit diagram of SAW filter within the mentioned search engine in the present invention.
Figure 8:
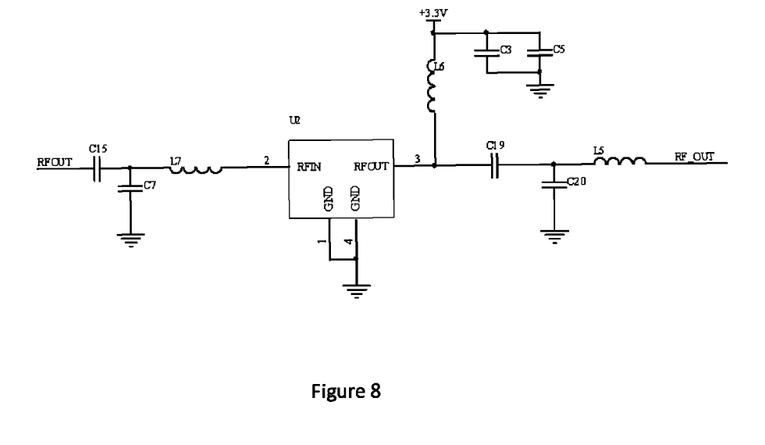
FIG. 8 is the circuit diagram of amplifier within the mentioned search engine in the present invention.

As illustrated in FIG. 4, FIG. 7 and FIG. 8, the mentioned SAW filter 2222 receives the integrated signal RFIN output from the change-over switch 2221, filters its out-of-band noise and gets the signal RFOUT. Then it is transmitted to the mentioned amplifier 2223 and amplified to RF_OUT. Then, RF_OUT is sent out to external onboard search engine host through coax cable connected to RF SMA joint J1. As distance of the cable transmitting antenna signal to onboard search engine host is more than 20 m, transmitting signals after amplification can effectively reduce noise figure of the receiving signals.

In the present embodiment, chip U3 of change-over switch 2221 can use type ADG904, which is only connected to one input signal in each selected status and then sends out the signal thus implementing the mentioned integration process on time division. The chip U2 of mentioned amplifier 2223 can use type MBC13916. The gate circuit type for driving control instruction is SN74LVCU04. Peripheral circuits of the above modules can be arranged as shown in from FIG. 5 to FIG. 9.

As illustrated in FIG. 3, after antenna signal process module 222, mixer amplifier module 223 at the search engine host converts the integrated signals into a certain fixed frequency, amplifies the signals to constant output amplitude under the range of whole signal and then output then to direction finding data process module 224. The direction finding data process module 224 samples the signals on time division, recovers to the three channels of signals received at direction finding antenna array 221 and then calculates phase differences of the received signals from direction finding antenna array 221. According to the datum, like relative position of the receiving antennas and the mentioned phase differences, the relative direction of the beacon sending SOS signals can be calculated.

The system control module 230 in the mentioned search engine receives the signal data sent from the above mentioned signal demodulation module 213, signal detect module 214 and direction finding data process module 224 respectively, and connects to a display module 240 and a buzzer 250 respectively. The mentioned system control module 230 controls the working status of the whole search engine, including signal integration on time division, display and volume control and data process and storage and so on.

The mentioned display module 240 processes and then shows the direction and distance information of the beacon from system control module 230 on LCD in a specific way, directly describing the relative position of the beacon. The mentioned buzzer 250 beeps differently according to the received beacon signals to remind the rescuers.

Figure 10:
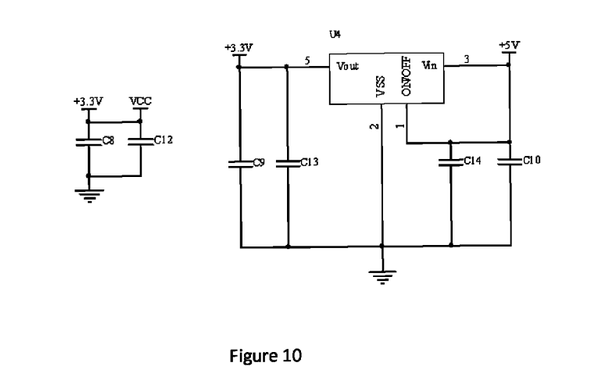
FIG. 10 is the circuit diagram of power divider module of antenna signal process module within the mentioned search engine in the present invention.

As shown in FIG. 3, the power supply module 260 of the mentioned search engine converts 220V AC to DC and provides +12V and +5V DC regulated power supply to the whole search engine system work. The mentioned antenna signal process module 222 can contain an additional voltage divider module 2225 (FIG. 10), which contains a voltage conversion part (as shown in the right part of FIG. 10) responsible of converting 5V voltage from power supply module 260 into 3.3V supply for antenna signal process module 222 and a power filter part responsible of filtering noise on power line (as shown in the left part of FIG. 10). The voltage divider module 2225 uses type S1112 for chip U4.

In the present embodiment, the mentioned mixer amplifier module 223 can use ASIC chips from Motorola, mini and so on, including amplifiers of MBC13916, MAR-6SM and ERA-8SM, mixers of ADE-1. The mentioned signal detect module 214 and signal demodulation module 213 can use ASIC chips ADF7020-1 from AD. The mentioned direction finding data process module 224 can be implemented with A/D ASIC chips AD9432BSQ-105, FPGA chip EP3C16Q240 and DSP chip TMS320DM642-600A. The mentioned display module 240 can be implemented with driving LCD from ARM and the power supply module 260 can be specialized AC-DC power module 260 from ARCH.

In summary, with the marine emergency position indicating system mentioned in the present invention, when someone carrying the beacon has fallen into the water, power supply of the beacon can be opened through drowning automatic switch or manual switch, therefore the beacon can emit wireless SOS signals out. Rescue boat or aircraft installed with search engine can search and receive SOS signals sent from all beacons over a 5-kilometer radius of sea area along the way to accidental site. The search engine can determine the direction and approximate distance between all the drowning persons carried with beacons and the search engine through wireless positioning technology to help rescuers implement fixed-point rescue. Therefore, the marine emergency position indicating system mentioned in the present invention can overcome the bad weather impact on marine rescue, speed up the rescue process and improve the success possibilities of fixed-point rescue.

Although the present invention has been described in detail in the way of above mentioned preferred embodiments, it should be fully aware that the above description is not to be construed as limiting of the present invention. Multiple revisions and substitute of the present invention can be evident to technical staff in the art after reading the above description. Hence, the scope of legal protection of the present invention should be determined by the appended claims.

The invention claimed is:

1. A marine emergency position indicating system comprising:
    a beacon, carried by marine staff, configured to send out wireless communication signals after a ship wreck, the beacon containing a power supply circuit, a signal process circuit, and an antenna, which are electrically connected;
    a search engine, mounted in a rescue boat or an aircraft, the search engine receiving wireless communication signals from neighboring beacons within a certain range and having a signal demodulation module for user identification and conflict detection, and two signal process modules for calculating relative distance and direction of each beacon based on the communication signals; modules within the search engine indicating the beacon direction, the modules containing:
        a direction finding antenna array, which contains multiple antennas according to the design of a distribution array, which respectively receive the wireless communication signals matched with the same beacon's emitting frequencies;
        an antenna signal process module having a change-over switch, the change-over switch integrating multi-channel signals from the multiple antennas of the direction finding antenna array into one channel;
        a mixer amplifier module, which converts the integrated one channel signal output from the antenna signal process module to a pre-set frequency and amplifies this signal in the whole signal range to a pre-set amplitude,
    wherein the antenna signal process module transmits the integrated one channel signal to the mixer amplifier module through one long distance cable; and
        a direction finding data process module, which samples the signals output from the mixer amplifier module on time-division base, recovers the multi-channel signals received from the direction finding antenna array, calculates phase differences of the multi-channel signals, and determines the relative direction between the sending beacon and the search engine.

2. The marine emergency position indicating system of claim 1, wherein
    the power supply circuit of the beacon contains power management module, signal trigger switch and battery which are respectively electrical connected to the said power management module, the signal trigger switch contains manual switch and drowning automatic switch which are respectively electrical connected to the power management module;
    the battery provides working power for the beacon;
    the manual switch can be used to manually open the power management module to make the beacon entering into working status;
    the drowning automatic switch can automatically open the power management module to make the beacon entering into working status by the way of detecting immergence; and
    the power management module can convert the supply voltage from battery into stable output working voltage when manual switch or drowning automatic switch is opened.

3. The marine emergency position indicating system of claim 2, wherein, an additional power switch, which is set between the battery and the power management module, can control the beacon to switch states between low power standby and power-off.

4. The marine emergency position indicating system of claim 3, wherein,
    the signal process circuit of the beacon contains system control module, modulation module, power amplifier and filter, which are electrical connected in sequence;
    the system control module is connected to the power management module;
    the filter is electrical connected to the antenna;
    the system control module transmits emitting data to the modulation module and controls the emitting timeline after receiving working voltage output from the power management module;
    the modulation module converts the received emitting data into modulated signals and transfers the signals to the power amplifier;

the power amplifier amplifies the received modulated signals to the emitting power required and transmits them to filter;

the filter receives the amplified signals from the power amplifier, and filters their noise and harmonic signals.

5. The marine emergency position indicating system of claim 2, wherein the beacon also contains a buzzer connected to the power management module, and the buzzer beeps when it receives the stable output working voltage from the power management module.

6. The marine emergency position indicating system of claim 1, wherein the search engine comprises:

a communication antenna, which receives the wireless communication signals matched with the frequency emitted from the beacon;

a filter amplifier module, which receives signals output from the communication antenna, filters noise from them and amplifies the required radio signals, wherein the signal demodulation module demodulates the signals output from the filter amplifier module, determines whether the signal is sent from the beacon with simultaneously deciding on beacon ID to distinguish multi-users according to the demodulated information, and confirms validity of this communication to realize conflict detection based on correctness of transmitted data; and the modules within the search engine indicating the relative distance include a signal detect module, which detects amplitude of the signals output from the filter amplifier module and estimates the relative distance between the sending beacon and the search engine.

7. The marine emergency position indicating system of claim 6, wherein the antenna signal process module comprises:

an interface driving module, which receives the control instruction and power output from the search engine host and forms control driving signals, the change-over switch integrating the multi-channel received signals from the direction finding antenna array into one channel by time division based on related control driving instruction; and a SAW-filter and amplifier, wherein the SAW-filter filters the integrated signal and the amplifier amplifies the integrated signal, and then transmits the integrated signal to the subsequent modules.

8. The marine emergency position indicating system of claim 7, wherein the change-over switch comprises:

multiple signal input end, which are connected to the multiple antennas from the direction finding antenna array respectively and receive the multi-channel signals from the multiple antennas;

several control instruction input ends, which receive related control instructions output from the search engine host through the interface driving module; and one signal output end, which is only connected to only one received signal of the changeover switch inputs under each selected status driven by the control instruction, to make the multi-channel receiving signals exist on time-division and integrated into one channel signal.

9. The marine emergency position indicating system of claim 8, wherein the search engine further comprises:

a system control module, which receives signals respectively output from the signal demodulation module, signal detect module and direction finding data process module, and controls the working status of the whole search engine;

a display module, connected to the system control module, which directly shows the information depicting the direction and the distance of the beacon on LCD;

a buzzer, connected to the system control module, which beeps differently according to the received beacon signals to remind rescuers.

10. The marine emergency position indicating system of claim 4, wherein the search engine comprises:

a communication antenna, which receives the wireless communication signals matched with beacon's emitting frequency, a filter amplifier module, which receives signals output from the said communication antenna, filters noise from them and amplifies the required radio signals, wherein the signal demodulation module demodulates the signals output from the filter amplifier module, determines whether the signal is sent from the beacon with simultaneously deciding on beacon ID to distinguish multi-users according to the demodulated information, and confirms validity of this communication to realize conflict detection based on correctness of transmitted data; and the modules within the search engine indicating the relative distance include a signal detect module, which detects amplitude of the signals output from the filter amplifier module and estimates on the relative distance between the sending beacon and the search engine.

* * * * *